(12) United States Patent
Qiu (10) Patent No.: US 7,707,406 B2
(45) Date of Patent: Apr. 27, 2010

(54) CERTIFICATE RENEWAL IN A CERTIFICATE AUTHORITY INFRASTRUCTURE

(75) Inventor: Xin Qiu, San Diego, CA (US)

(73) Assignee: General Instrument Corporation, Horsham, PA (US)

(*) Notice: Subject to any disclaimer, the term of this patent is extended or adjusted under 35 U.S.C. 154(b) by 1205 days.

(21) Appl. No.: 10/703,104

(22) Filed: Nov. 5, 2003

(65) Prior Publication Data

US 2004/0148505 A1    Jul. 29, 2004

Related U.S. Application Data

(60) Provisional application No. 60/424,893, filed on Nov. 8, 2002.

(51) Int. Cl.
*H04L 29/06* (2006.01)
(52) U.S. Cl. .................... 713/157; 713/155
(58) Field of Classification Search ............ 713/178, 713/176, 155–158; 380/23, 25; 726/5–6, 726/10
See application file for complete search history.

(56) References Cited

U.S. PATENT DOCUMENTS

| | | | | |
|---|---|---|---|---|
| 5,671,279 | A * | 9/1997 | Elgamal | 705/79 |
| 6,058,484 | A * | 5/2000 | Chapman et al. | 726/10 |
| 6,367,013 | B1 * | 4/2002 | Bisbee et al. | 713/178 |
| 6,385,596 | B1 * | 5/2002 | Wiser et al. | 705/51 |
| 6,397,329 | B1 | 5/2002 | Aiello et al. | |
| 6,442,688 | B1 | 8/2002 | Moses et al. | |
| 6,615,347 | B1 * | 9/2003 | de Silva et al. | 713/156 |
| 2002/0080975 | A1 | 6/2002 | Rich et al. | |
| 2002/0184493 | A1 * | 12/2002 | Rees | 713/158 |
| 2005/0114653 | A1 * | 5/2005 | Sudia | 713/158 |

FOREIGN PATENT DOCUMENTS

| WO | WO 0189133 A | 11/2001 |
|---|---|---|
| WO | WO 0217557 A | 2/2002 |

OTHER PUBLICATIONS

Structured Arts White Paper, CertKit™, *Certificate Chain Building, Verification, and Revocation Checking in CertKit*, pp. 1-18, SA Revision Dec. 8, 1998.
Windows 2000 Certificate Services at URL http://www.microsoft.com/technet/prodtechnol/windows2000serv/deploy/2000cert.asp?fra..., pp. 1-25, 2003.

* cited by examiner

*Primary Examiner*—Kimyen Vu
*Assistant Examiner*—Edward Zee
(74) *Attorney, Agent, or Firm*—Larry T. Cullen (57) ABSTRACT

A system using digital certificates having overlapping validity intervals. The overlapping certificates can be used in a hierarchical certificate authorities network in order to obtain benefits such as to increase the usage of all the certificates in the certificate chain; reduce/eliminate the certificate updates/downloads to a large population; only replace the minimum number of certificates in the trust hierarchy to re-establish the certificate chain; reduce the complexity of maintaining certificate nesting in certificate generation process; reduce the risk of service interruption; and control the extent of older technology in circulation and to reduce the risk associated with older products being more susceptible to attack. The certificate renewal process of a preferred embodiment is described.

19 Claims, 4 Drawing Sheets

CERTIFICATE RENEWAL IN A CERTIFICATE AUTHORITY INFRASTRUCTURE

CLAIM OF PRIORITY

This application claims priority from U.S. Provisional Patent Application Ser. No. 60/424,893, filed Nov. 8, 2002 entitled "OPTIMIZING CERTIFICATE RENEWAL PROCESS FOR LARGE SCALE PKI DEPLOYMENT IN A HIERARCHICAL CERTIFICATE AUTHROITY INFRASTRUCTURE" that is hereby incorporated for reference as if set forth in full in this document for all purposes.

BACKGROUND OF THE INVENTION

This invention relates in general to security of digital information and more specifically to a certification system for digital information transfer.

Digital information has become extremely important in all aspects of commerce, education, government, entertainment and management. In many of these applications, the ability to ensure the privacy, integrity and authenticity of the information is critical. As a result, several digital security mechanisms have been developed to improve security.

One approach to digital security that is commonly used is for a certificate authority (CA) to issue a certificate to a certificate holder. The holder can then provide the certificate to a third party as an attestation by the CA that the holder who is named in the certificate is in fact the person, entity, machine, email address user, etc., that is set forth in the certificate. And that a public key in the certificate is, in fact, the holder's public key. People, devices, processes or other entities dealing with the certificate holder can rely upon the certificate in accordance with the CA's certification practice statement.

A certificate is typically created by the CA digitally signing, with its own private key, identifying information submitted to the CA along with the public key of the holder who seeks the certificate. A certificate usually has a limited period of validity, and can be revoked earlier in the event of compromise of the corresponding private key of the certificate holder, or other revocable event.

One standardized approach to today's digital security is referred to as the Public Key Infrastructure (PKI). PKI provides for use of digital certificates to authenticate the identity of a certificate holder, or to authenticate or certify other information. Typically, a PKI certificate includes a collection of information to which a digital signature is attached. A CA that a community of certificate users trusts attaches its digital signature and issues the certificates to various users and/or devices within a system.

If a certificate has expired, another certificate can be obtained by going through the proper steps to contact a CA and obtain another valid certificate. This approach may work well where, for example, certificates are assigned to users and a user is responsible for obtaining, updating (e.g., when a user's identification information changes) and renewing that user's certificate. However, the generation, transmission and updating of certificates in association with hardware devices (i.e., the hardware devices are each associated with a certificate) may introduce problems in certificate management, transmission, control, use, etc., especially where the number of devices is large.

BRIEF SUMMARY OF THE INVENTION

The present invention allows certificates having overlapping validity to be used. The overlapping certificates can be used in a hierarchical certificate authorities network in order to obtain benefits such as to increase the usage of all the certificates in the certificate chain; reduce/eliminate the certificate updates/downloads to a large population; only replace the minimum number of certificates in the trust hierarchy to re-establish the certificate chain; reduce the complexity of maintaining certificate nesting in certificate generation process; reduce the risk of service interruption; and control the extent of older technology in circulation and to reduce the risk associated with older products being more susceptible to attack. The certificate renewal process of a preferred embodiment is described.

In one embodiment the invention provides a method for providing a certificate in a digital security system, the method comprising receiving a first certificate including a first validity period; receiving a second certificate including a second validity period, wherein the second validity period overlaps with the first validity period and wherein the periods are not the same; and providing one of the certificates to a device.

DETAILED DESCRIPTION OF THE INVENTION

A preferred embodiment of the invention is designed to provide certificates in a digital content distribution system where many user devices are granted permission to access, play back, or otherwise present the digital content. For example, digital video can be distributed by satellite, cable, fiber optic or other communication links using digital networks such as the Internet, corporate or campus intranets, local area networks, etc. Ultimately, the digital video is presented to a user or viewer so that the user can play back the image and audio content on a home entertainment system, computer system, or other presentation system.

In the digital video application, the device that performs decoding, decryption and other processing of the content so that it can be output to audio speakers and to a display is referred to as a "set top box." However, in general any type of device that processes content for presentation (e.g., personal digital assistant, cell phone, streaming video player, etc.) can be employed. Additionally, the device level can include control devices for facilitating the transfer of information, arbitrating network resources, updating processes and devices, etc. Although the invention is described primarily in reference to a digital video distribution scenario, it should be apparent that other scenarios and applications can benefit from the use of various features of the invention.

Figure 1:
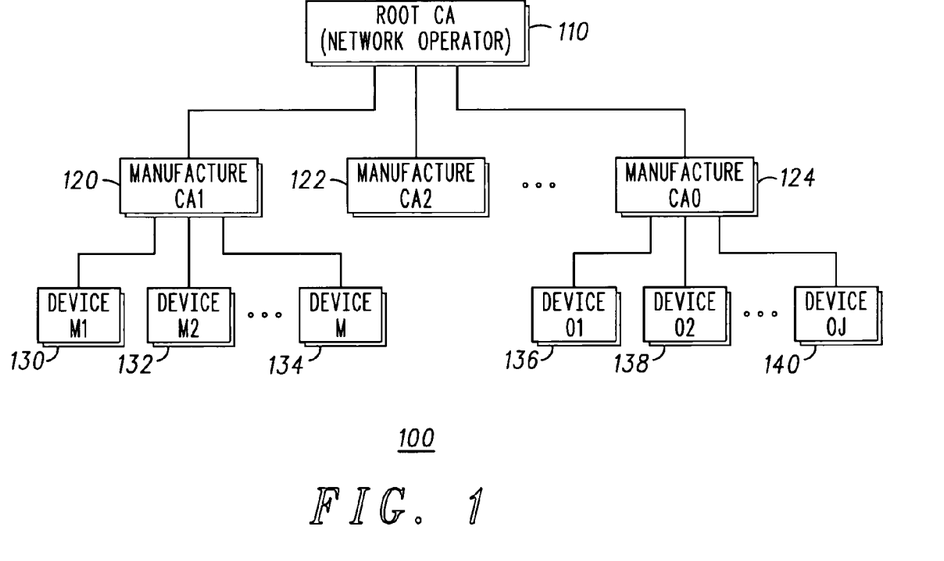
FIG. 1 shows a trust hierarchy according to a preferred embodiment of the present invention.

FIG. 1 illustrates the basic arrangement of a trust hierarchy suitable for use with the present invention.

In FIG. 1, trust hierarchy 100 includes three levels of participants in a network organization including manufacturer sites of set top boxes and the set top boxes, or devices, themselves. A first level, or root level, includes network operator 110. The network operator is responsible for issuing the root level certificate to the manufacturing level of the hierarchy. In general, the network operator can be any entity sufficiently authorized and entrusted to carry out the certificate services. The network operator also must establish the physical identity of manufacturers and must ultimately establish, control and ensure the integrity of certificates distributed in the hierarchy. In the set-top box application, for example, a network operator can be established or licensed by a major media distributor. Second level participants can be manufacturers of set-top boxes or other playback devices. At the third level are the manufactured devices that are typically resident in a consumer's home or, as in the case of portable devices, are kept on a user's person.

Once manufacturers such as 120, 122 and 124 are physically identified the network operator (i.e., root certificate authority ("Root CA")) certifies each manufacturer's public key by issuing a unique manufacturer certificate. The Root CA also publishes its own certificate to manufacturers. Each manufacturer uses their certified key to create device certificates for devices such as 130-140 in FIG. 1. A manufacturer is responsible for creating device certificates, and also for loading device key/certificate, the manufacturer's own certificate and the Root CA's certificate to a device at the manufacturing facility. For example, device 130 is issued a device certificate unique to device 130. Device 130 will also have a certificate from manufacturer 120 and the root level certificate from network operator 110. Similarly, devices 132 and 134 also include certificates from manufacturer 120 and network operator 110. Devices 136, 138 and 140 include certificates from manufacturer 124 and from network operator 110.

In a preferred embodiment, certificates at a given level have validity periods that overlap with certificates at other levels. Specifically, a subject certificate at a lower (Subject) level, such as a manufacturer level, can have a validity period that overlaps with one or more root (Issuer) level certificates from which the subject certificate did not issue. For example, assume a first root certificate is used to provide a key for a first manufacturer certificate. At a later time the first root certificate will be renewed so that a renewed root certificate is in place. However, the manufacturer certificate issued with the first root certificate is still valid even though a renewed root certificate has been issued and is now used to create all subsequent manufacturer and device certificates. Similarly, device certificates can overlap with manufacturer and root certificates.

In a preferred embodiment, devices are issued device certificates with validity periods that are anticipated to be longer than the operational lifetime of the device. For example, a period of 20 years is used in the preferred embodiment. When a device certificate expires, that device is no longer operable. The 20 year period is selected as a long enough time so that the device will most likely have been made obsolete by new technology. Or the device may fail either electronically or mechanically, or the device lifetime would be exceeded for other reasons. In other words, the preferred embodiment assumes that device certificates will not need to be renewed. Other embodiments can allow device certificates to be renewed, can have varying validity periods for certificates, or can provide other variations.

The validity period chosen can depend on a number of factors, such as the strength of the encryption technology used, e.g. the strength of the private key used to sign the certificate, and the desire to minimize traffic on the network and to reduce the burden of operation on certificate authorities. The longer and more often a certificate and its associated information (e.g., a private key) is used, the more susceptible it is to loss or discovery. Therefore, restricting certificate lifetime could be used to control the extent of older technology in circulation and to reduce the risk associated with older products being more susceptible to attack. However, the shorter lifetime is defined, the more often certificate renewal or re-enrollment would need to be performed, which would increase the operational cost of a certificate authority. This could also complicate the message protocol that needs to be built in the system to generate the alert for certificate expiration.

Manufacturer certificates are renewed after a two year period and are valid for 20 years. Note that any validity periods, intervals or other specific values or ranges discussed herein can vary with different embodiments. The validity periods can be eternal, tens of years, months, days, minutes, etc. The periods can be selected according to desired certificate policies, design choices or for other reasons.

At the end of each two year renewal period the manufacturer must obtain another certificate from the network operator. During the two year period the manufacturer can issue device certificates under the then-current manufacturer certificate. Similarly, the network operator, or Root CA, renews its root certificate every 2 years. At both the manufacturer and network operator levels, the certificates are issued with a different key every 30 years, or after fifteen 2-year renewal periods. As mentioned, this approach results in certificates at lower (Subject) levels overlapping with renewed certificates at the higher levels (Issuer). Details and implications of this overlapping approach are described below.

With the three-level approach of the preferred embodiment network operator and manufacturer certificates are renewed every 2 years and re-keyed every 30 years. The network operator is regarded as the root Certification Authority (CA) in the trust hierarchy and renews and/or reissues its root certificate every two years by self-authenticating with the same root key provided the key has been in use for less than 30 years. The root CA uses a rekeying renewal process. The manufacturers are "sub CA," or mid level CA entities and renew their certificates from the root CA every two years without having to change the key as long as the key has been in use for less than 30 years. To limit the use of the same key for generating device certificates to no more than 50 years, the Manufacturer CA uses the rekeying renewal process after 15 renewals. This procedure results in the same key being used no more than 50 years as 30 years to rekey plus 20 years lifetime of a key issued at the end of the 30 year period. The end entity (device) certificate does not need to be renewed because the original overlapped validity period provides a sufficient validity period to cover the expected operational lifetime of the device.

Network Operator—Physical Identification

Physical identification and certification of manufacturers is performed by the network operator to establish the true identity of each manufacturer. Once physical identification is accomplished the network operator has some assurance that the known electronic communication channels (e.g., email address, Domain Name System (DNS) address, etc.) are reliable ways to contact the manufacturer. The certification process for the Network Operator who operates the root CA and certifies a Manufacturer CA includes (1) a registration (administrative) process and (2) a certificate management (technical) process.

In the registration process the network operator can receive and verify signed and notarized paper documents or other credentials. Any type of generally accepted, or official documents or other information can be obtained and used for this purpose. Approval and issuance of a manufacturer's certificate is contingent upon the manufacturer being identified to the satisfaction of the network operator.

In the certificate management process the electronic certificate is created and issued. The certificate is also recorded and tracked through the lifetime of the certificate. The management process includes control and management of the certificate such as renewing, revoking, and other maintenance.

In many cases a network operator might already have established business relationships with manufacturers prior to the deployment of a distribution network and end-user devices. Given these existing relationships, the registration and validation process can be simplified significantly. However, when a new manufacturer becomes a member of the network, when an existing manufacturer out-sources its secure activities to a third party, or in other instances where a new manufacturer is introduced the network operators will generally conduct a thorough physical identification and registration process. This process typically involves face-to-face presence with a manufacturer's representative and a network operator representative.

For example, a manufacturer's representative might visit a security officer or operator to submit the certificate request. A Public Key Cryptography Standard (PKCS), e.g., PKCS#10 Certification Request Syntax Standard format can be used to submit the certificate request and a PKCS#7 format can be used to receive the certificate. This registration process may require the representative of a manufacturer to prove the representative's personal identity, the identity of the company, and the representative's employment with and authorization by the company to perform the transaction. Although this approach is relatively straightforward it requires the representative of a manufacturer to personally visit a network operator's administration office and can be inconvenient.

Another approach uses electronic communications rather than in-person meetings. The network operator sends an application form to a new manufacturer via mail, fax or another channel. The manufacturer is required to supply the information shown in Table I, below.

TABLE I

Manufacturer CA Organizational Information:

Organization name
Organization address
Organization Tax Identification Number or other documents that can prove the business identity
Personal contact information:

Company ID and/or driver's license, passport or other means of identification
Email address
Work phone number
Employment references
Authorization letter from an officer of the company The complete application form is notarized and then sent to the network operators' offices by a preferred means such as by fax, encrypted email, a secure link such as a virtual private network (VPN), etc. Naturally, any suitable communication means can be used, as desired.

The manufacturer should have a Manufacturer certificate authority (CA) to keep and safeguard copies of all the documents submitted. Some of information will be needed again to submit the certificate request to the Network Operator. The administrator (or a security officer) should validate all the information provided by a Manufacturer CA. The Manufacturer should electronically generate and transmit the certificate request to the network operator CA, or Root CA. A certificate request can include basic information such as the Manufacturer CA's public key and manufacturer identity information previously sent. The request is signed by the private key of the Manufacturer CA to prove it holds the corresponding public key.

The network operator compares the information received in the certificate request with the paper document that includes the information in Table I. If the information matches, the Root CA signs the manufacturer's certificate, thereby authenticating the identity of the requester. In addition, the Root CA can "stamp" the certificate with an expiration date. The certificate can be sent to the Manufacturer CA directly.

Certificate Validation Chain

A preferred embodiment of the invention uses digital certificates in compliance with Standard X.509 Version 3. See, e.g., RFC 2459, "Internet X.509 Public Key Infrastructure," January 1999. Three types of certificates are used as follows: (1) self-signed Root CA certificates, (2) manufacturer CA certificates and (3) device certificates. The chain starts with an end-entity certificate at the lowest level of the trust hierarchy followed by a succession of one or more mid-level CA certificates (e.g., a manufacturer's certificate) where each CA certificate is the parent (Issuer) of the previous certificate (Subject), terminating in a self-signed root certificate at the top level, or first level. Other embodiments can use any number and type of levels in a hierarchy.

In order to limit ongoing risk to the system, the certificate validation process defined below is used to prevent unauthorized equipment and associated entities (e.g., equipment vendors) from re-entering the network. The certificate validation process tries to ensure that every signature in the certificate chain is verified, that every certificate validity period in the certificate chain is checked, and that certificate revocation checks are performed.

Certificate signature verification is used to check the validity of an end-entity device certificate. A Manufacturer certificate is used to verify the signature in the end-entity certificate and a root certificate is used to verify the signature in the Manufacturer certificate.

In a digital video content distribution application the distribution network usually only involves a small number of distribution nodes, or "headend" equipment. For example, the number of headend installations can be on the order of dozens. In this case, using a certificate revocation mechanism to address the problem associated with longer lifetimes will not cause the size of the certificate revocation database to increase significantly. Therefore, all the certificates can have a relatively long lifetime such as 20 years as the default.

In general, replacing the certificate after its expiration date could be a manual process. However, if a Manufacturer CA wishes to define its certificates with a short lifetime then an automated mechanism may need to be designed into its equipment to keep track of certificate expiration time such that all devices could obtain their new certificates in time before the old ones expire. An alert can also be originated at the manufacturer and sent over the network to the device so that a user of the device can take appropriate action such as by obtaining a renewed certificate, exchanging the device, etc.

In a preferred embodiment of the invention, the validation of validity period nesting is not required. However, a simple point-wise certificate validity check is performed to ensure all the certificates in the certificate chain are valid at the time when the check is performed. After 60 days of expiration of any certificate in the certificate chain any applications, processes, procedures, etc., whether manual or automatic, that use the expired certificate must cease. Note that other embodiments can use different approaches to a "grace" period for expiration such as not allowing expired certificates to be used for any length of time after expiration. One reason for allowing the grace period in the preferred embodiment is to prevent harsh results such as suddenly stopping a manufacturer from production. Another approach can provide an alert to a manufacturer when expiration is approaching. Other actions, such as additional notification to a manufacturer, restriction from participation in the distribution system, legal enforcement, etc., can be taken if certificates are not updated.

Usually the physical extraction of equipment with revoked certificates is only practical in small systems or networks with a manageable number of devices. In cases of larger networks with many devices a certificate revocation process can be used to electronically deactivate a device that is no longer trusted. A preferred embodiment uses a certificate revocation process that is part of standard PKI, in which the Certificate Authorities process revocation requests, and generate and maintain Certificate Revocation Lists (CRLs). A standard X.509 CRL is used. Note that the present invention attempts to minimize network traffic by reducing the need to transfer certificates, create CRLs and transfer other information. One way this is accomplished is with creation of new certificates at fixed, relatively long, intervals and by allowing certificates created with older Issuer certificates to remain valid.

A Manufacturer CA's certificate may become invalid before the normal expiration of its validity period. The network operator may suspend or revoke any certificate issued to the Manufacturer CAs, if the network operator believes, e.g., manufacturers' private keys may have been lost, used in an authorized manner, or otherwise compromised. Under such circumstances, the root CA revokes the Manufacturer CA's certificate by including the certificate's serial number on the next scheduled CRL. Similarly, a Manufacturer CA can revoke any individual device if a device's key may have been compromised. The CRL can be stored and distributed to other parties who may wish to check the certificates against the CRLs.

If a Manufacturer CA's certificate is revoked, the manufacturer is required to go through the initial registration process with the network operator, as described above, to obtain a new certificate. After receiving a new certificate, the Manufacturer CA re-issues new certificates to all of the manufacturer's associated devices. Otherwise, all the device certificates are inherently revoked.

Certificate Renewal Process and Policy

There are two basic scenarios of certificate renewal as follows: (1) Creating a new certificate with the same name, key, and other information as the old one, but a new, extended validity period and a new serial number; and (2) creating a new certificate with a new, different public key (corresponding to a new, different private key) and a different serial number, and a different validity period. This second form of renewal is also known as a "re-key" process.

A simple point-wise certificate validity check is performed to ensure that all the certificates in the certificate chain are valid at the time when the check is performed. Therefore, maximizing the overlapping validity period of all the certificates could reduce the operational cost because a frequent certificate renewal process over a large population (such as the device population) is avoided. A preferred embodiment of the invention allows reduced complexity of certificate nesting by using the certificate policies in Table II.

TABLE II

1. The Root CA renews/reissues its root certificate every two years with the same root key provided the key has been in use for less than 30 years. Otherwise a rekeying renewal is performed.
2. The Manufacturer CA renews its certificate from the Root CA every two years without having to change its key when the key has been in use for less than 30 years. Otherwise a rekeying renewal is performed.
3. All CAs shall always use their most recent and updated key/certificate in the new certificate generation operation.
4. Device certificates have a validity period of 20 years FIG. 2 illustrates overlapping certificate validity periods.

Figure 2:
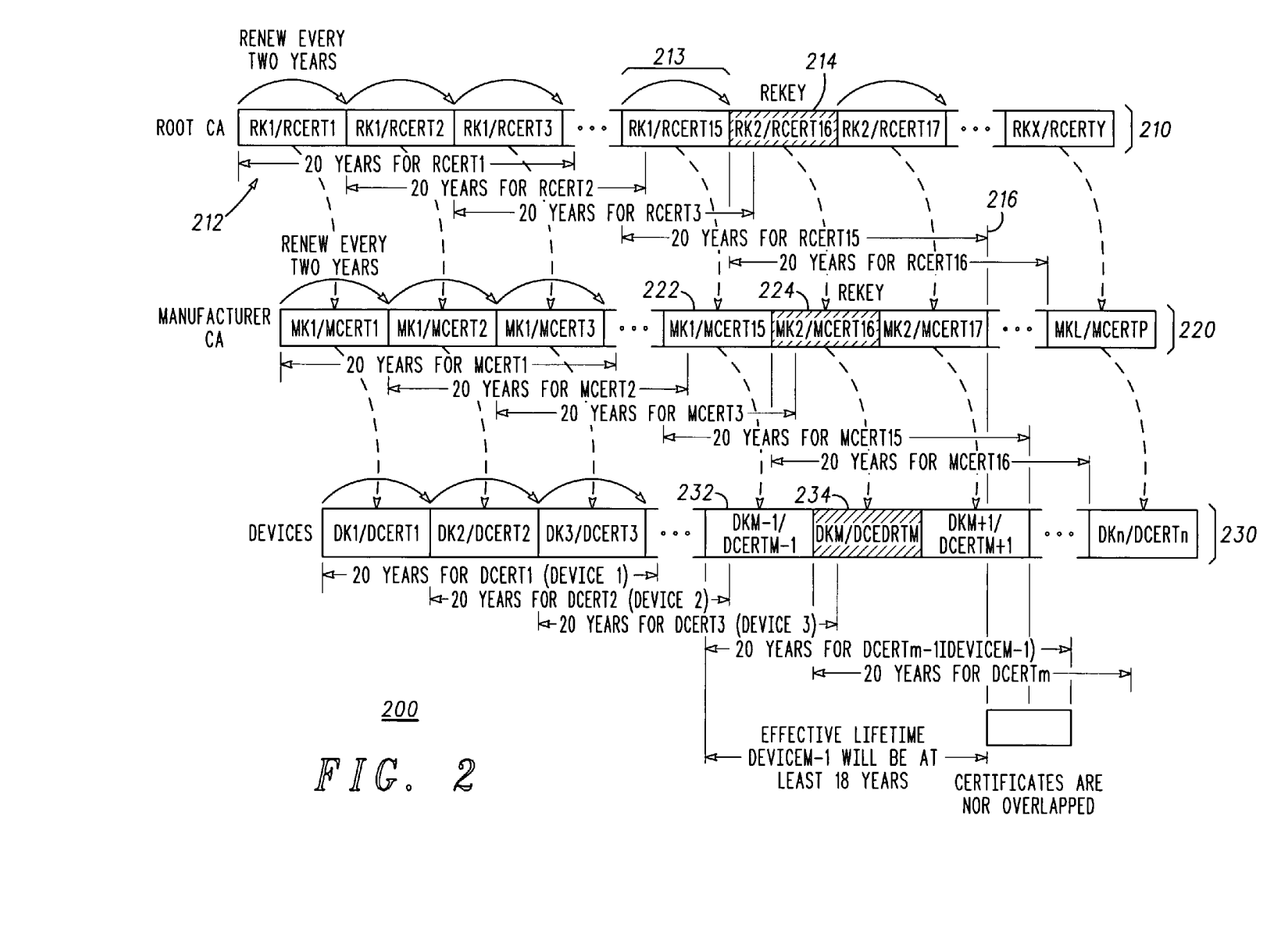
FIG. 2 illustrates a time line showing use of certificates with overlapping validity periods.

In FIG. 2, diagram 200 includes separate timelines for each of the three tiers, or levels, in the trust hierarchy. First level 210 corresponds to the Root CA, or network operator, certificates. Second level 220 corresponds to Manufacturer CA certificates. Third level 230 corresponds to device certificates. Certificate Rcert1 at 212 includes the public key of RK1 that can be used to verify the Root CA's signature on manufacturer certificates, such as on Mcert1. The public key of the manufacturer is provided with Mcert1. Mcert1 is provided by the Root CA and is signed with the private key of RK1. The private key of MK1 is used to sign the device certificates. Mcert1 is also valid for 20 years. Finally, the private key of MK1 is used to sign Dcert1. Dcert1 includes the public key of DK1.

Both the public and private keys of DK1 are created by the manufacturer and provided to the specific device at the time of manufacture. In a preferred embodiment the device certificate and private key can be updated, if necessary.

As shown in first level 210, as each 2-year renewal period for Root CA certificates expires, a new certificate is created (RK1/Rcert1, RK1/Rcert2, RK1/Rcert3, . . . ) using the same key, RK1. At the end of the validity period of the 15th certificate, at 214, a new key, RK2, is used to continue generating certificates (RK2/Rcert16, RK2/Rcert17, . . . ).

During the 2-year period before renewal of a root certificate the root certificate can be used to generate any number of manufacturer certificates. Other embodiments can place restrictions, such as a number or type limit, on certificates that are issued using the root certificates. As successive root certificates are renewed over time a root certificate currently being used by a Root CA will not necessarily be the root certificate in the chain of a manufacturer or device certificate since the manufacturer and/or device certificates may have been created using a prior root certificate. Similarly, a valid device certificate may not have the current corresponding manufacturer's certificate in its chain. However, even though the current root certificates may not be a particular manufacturer/device certificate chain, the prior root certificates (i.e., non-current root certificates) will still validate due to their ongoing validity periods that can overlap with validity periods of current certificates. A similar situation exists with manufacturer certificates with respect to device certificates. Other embodiments can exhibit certificate relationships among any number of levels.

Thus, a point-wise certificate validity check that is performed on a manufacturer or device certificate that uses prior root and/or manufacturer certificates in its chain will still validate. The point-wise check can be performed by software, hardware or a combination of both, (or another process such as manually, etc.), to determine whether the certificate chain is valid at a certain point in time. This is a fast way to perform a validity check that does not require extensive use of network bandwidth. In normal operation of the system, each device is associated with only one certificate chain that does not need to be updated since the certificate chain is expected to last beyond the lifetime of the device. Other embodiments can use different approaches to device certificates, including renewable certificates.

At 222 manufacturer certificate Mcert15 uses root key RK1. The manufacturer uses the private key of MK1 to sign Dcertm-1. At 214 a rekey at the root CA occurs. The new root key is designated as RK2. Manufacturer certificates signed using RK2 include a new manufacturer's key, MK2, as shown beginning at 224. Device certificates signed with MK2 also include Root CA certificates signed with RK2 in their certificate chain. Thus, the last root certificate using RK1 is Rcert15 having 2-year period 213 in which to issue certificates. The expiration of Rcert15 is shown at 216, after 20 years. Therefore, device certificate Dcertm-1 at 232 must expire no later than at 216. A new device key (DK) may be generated at the REKEY at 234.

In a preferred embodiment, the Root CA rekey process is performed after the key has been in use for 30 years, because the longer and more often a key is used, the more susceptible it is to loss or discovery. New certificates are issued to Manufacturer CAs by the Root CA when the Root CA rekeys and begins issuing manufacturer certificates with a new manufacturer key. When a Root CA rekey occurs because of a compromise (that can happen at any time) each Manufacturer CA should immediately send a new certificate request to the Root CA. The Manufacturer CAs would then update all device certificates with the new manufacturer certificates issued by the Root CA as a result of the rekey operation. Upon a rekey, the Root CA can identify and authenticate Manufacturer CAs either by performing the physical identification and/or registration process described, above, or if it has been less than 10 years since a Manufacturer CA was identified as required then by using the currently valid certificate issued to the Manufacturer CA by the Root CA.

Figure 3:
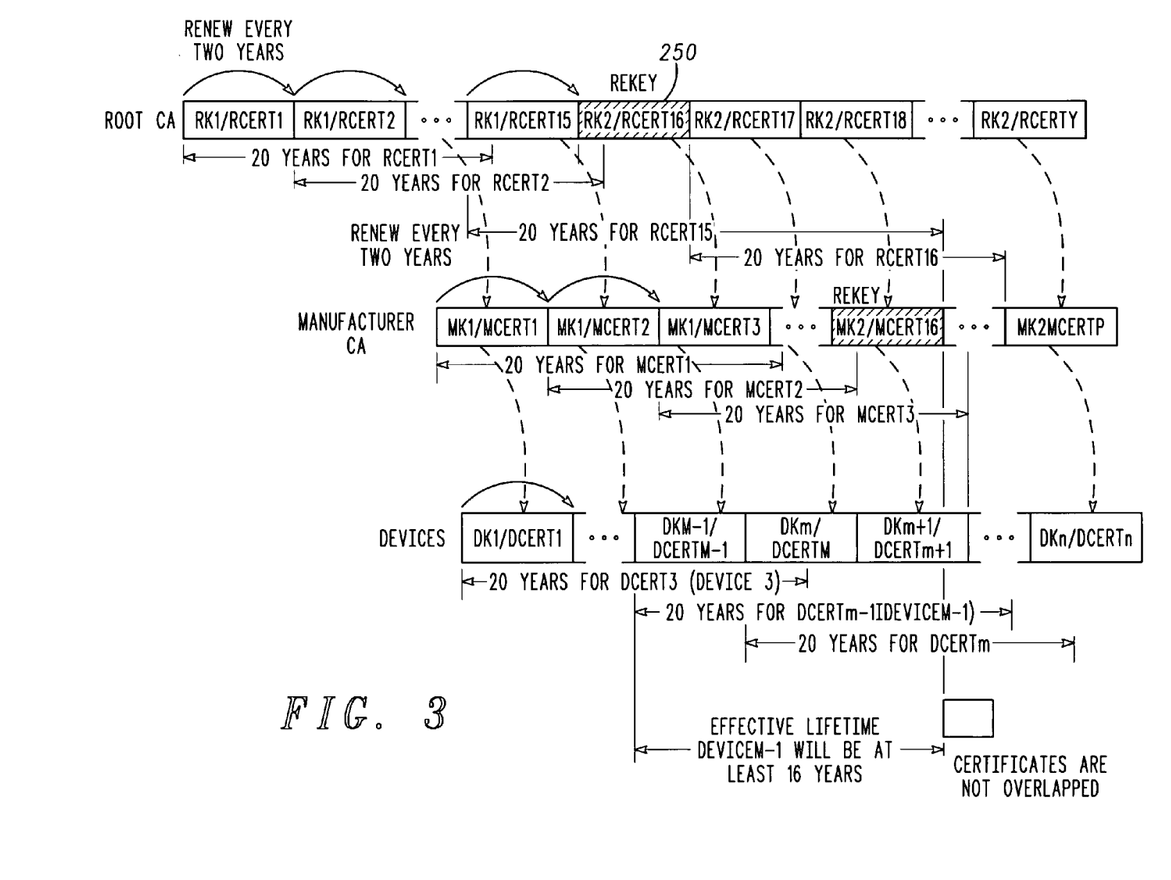
FIG. 3 shows a time line where a rekey operation is performed at the Root CA.

FIG. 3 illustrates a case where a rekey of the root takes place but does not require a manufacturer rekey. Such a situation can occur, for example, when the root key has been compromised and a scheduled root rekey will not take place for some time.

In FIG. 3, the Root CA rekeys the root key from RK1 to RK2 at point 250. If the Manufacturer CA's key is not compromised then the Manufacturer can apply its new certificate from the root CA without changing its own key (assume its key is indexed by MK1). If the rekey is a result of a root key being compromised, then the Manufacturer CA updates all the devices that have been created under MK1 with the new Root CA certificate and new Manufacturer's certificate. If the "rekey" process is performed under the assumption that the key could be compromised in the future, not because it is already compromised, then no certificates need be updated in devices that are already created under RK1 and MK1.

When the Manufacturer CA changes its key from MK1 to MK2 under the circumstance that the key is compromised, the device certificates created under MK1 needs to be revoked. But if the "rekey" process for Man CA is performed under the assumption that the key could be compromised in the future, not because it is already compromised, then certificates do not need to be updated in devices that are already created under the MK1.

Device rekeying can also be used to allow a device to recover from a compromised key. The device re-key is performed by the device's associated Manufacturer CA. The Manufacturer CA generates the device key pair and issues a new device certificate.

Table III summarizes some use cases and requirements for certificate rekey scenarios.

TABLE III

| Use Cases | Rekey Scenarios | Actions |
|---|---|---|
| 1 | Only the ROOT CA requires rekey Neither the Manufacturer/CA(s) nor device(s) requires rekey. | The ROOT CA shall use/distribute its new certificate to manufacturer CA(s), whenever it receives a new certificate request or a certificate renewal request from a Manufacturer. |
| 2 | Only some Manufacturer/CA(s) require(s) rekey Neither the ROOT CA nor the devices require rekey | The ROOT CA shall always use its most recent and updated certificate in response to the manufacturer CAs' rekeying renewal requests. The ROOT CA shall generate new certificates for all re-keying manufacturer CAs. The re-keying Manufacturer/CA(s) shall use the most recent and updated key/certificates when they generate new device certificates. |
| 3 | Only some devices require rekey Neither the ROOT CA nor the Manufacturer/CA(s) requires rekey | The Manufacturer/CAs shall issue new certificates to all re-keying devices |

Figure 4:
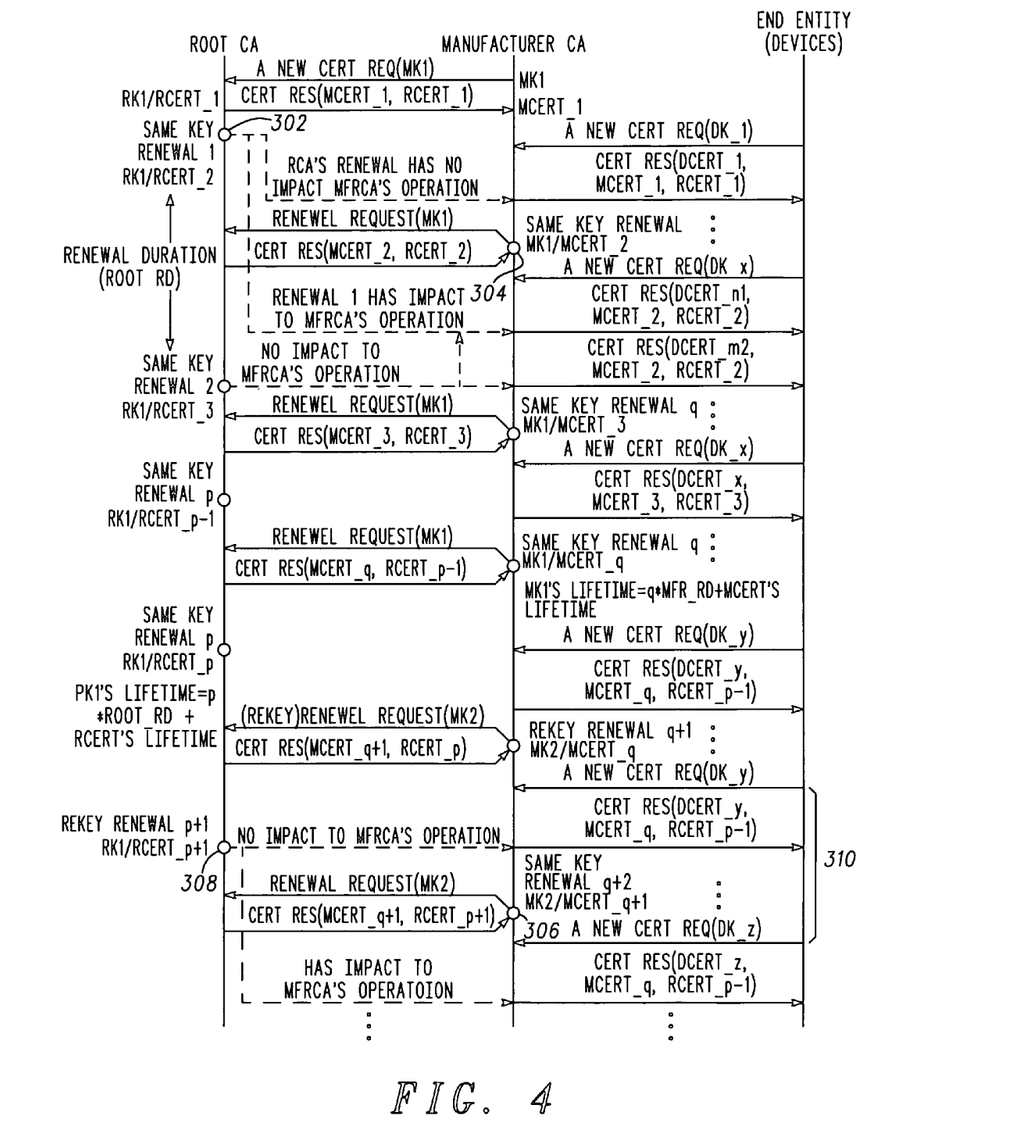
FIG. 4 illustrates a high-level message flow of a certificate renewal process.

FIG. 4 illustrates a high-level message flow of a certificate renewal process.

In FIG. 4, a first step occurs when a Manufacturer CA (also referred to as a "Sub" CA) makes a request for a new certificate from the Root CA. The request is made using the Manufacturer CA's current key, MK1. The Root CA responds by generating and issuing a certificate response as "(MCert_1, RCert_1)". This notation indicates that the issued certificate includes the new Mfr CA certificate, "MCert_1," and the Root CA certificate, "RCert_1". Next, a device certificate is needed (e.g., a new device has been manufactured) from the Mfr CA. The Mfr CA issues a certificate response as "(DCert_1, SCert1, RCert1)" indicating that the response includes the Root CA, Mfr CA and device certificates.

At 302, the white circle symbol on the Root CA's timeline indicates that a Root CA certificate renewal occurs without a re-key operation. In this case there is no impact to the Mfr CA's operation and the Mfr CA can continue to issue device certificates as usual. At 304 a Mfr CA renewal (without re-key) occurs and the Mfr CA obtains a new certificate from the Root CA to continue issuing device certificates with the newly obtained Mfr CA certificate and any current Root CA certificate. Subsequent certificate renewals by the Root CA and Mfr CA proceed in a similar manner.

As indicated by bracket 310, at 306 a re-key renewal for the Mfr CA occurs. This causes a new Mfr CA certificate including a new Mfr CA key to be issued by the Root CA to the Mfr CA. At 308 a Root CA re-key operation occurs.

Although the invention has been discussed with reference to specific embodiments thereof, these embodiments are illustrative, and not restrictive, of the invention. For example, although the PKI system is used in a preferred embodiment, other embodiments may merely use portions of the PKI system or can use other systems. Although specific embodiments have been described in connection with a digital video distribution network, other applications are possible that use different devices, organization, number of levels, etc.

Any number of levels can be used in a trust hierarchy. The trust hierarchy need not follow the rigid level structure shown in FIG. 1. For example, it may be possible for multiple manufacturer levels (e.g., manufacturer subsidiary, affiliate), root and device levels to exist in a same hierarchy. Any number of CAs can exist at any of the levels. Other security approaches can be used in conjunction with the features of the present invention's embodiments.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable carrier" for purposes of embodiments of the present invention may be any medium or transmission that can contain, store, communicate, propagate, or transport the program for use by or in connection with the instruction execution system, apparatus, system or device. The computer readable carrier can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in the following claims and/or to the particular embodiment disclosed as the best mode contemplated for carrying out this invention, but that the invention will include any and all embodiments and equivalents falling within the scope of the appended claims.

What is claimed is:

1. A method for providing a certificate in a digital security system, the method utilizing at least one computer configured to perform the steps of:
   issuing a first certificate from a first certificate authority (CA), wherein the first certificate has a first renewal period;
   issuing a second certificate from a second CA by using at least a portion of information in the first certificate, said second certificate having a validity period, said first renewal period and said validity period overlapping one another;
   issuing a third certificate unique to a given device by using at least a portion of information in the second certificate; and
   creating a new certificate at the first CA to be used in subsequent issuing steps of the first and second CAs in place of the first certificate,
   wherein a validity chain of the second certificate remains valid after the step of creating the new certificate has been performed,
   said third certificate being stored in said given device.

2. The method of claim 1, wherein the first CA includes a process at a first location and wherein the second CA includes a process at a location separate from the first location.

3. The method of claim 2, wherein the second process receives a Root CA certificate from a root-level process.

4. The method of claim 3, wherein the root-level process issued self-authenticated certificates.

5. The method of claim 1, wherein said given device includes a set-top box for receiving encrypted digital content.

6. The method of claim 1, wherein the certificates are in accordance with Standard X.509.

7. The method of claim 1, further comprising renewing the first certificate.

8. The method of claim 7, wherein the validity periods of the first and second certificates each have a predetermined interval and start time.

9. The method of claim 8, wherein the start times of renewed certificates are two years apart.

10. The method of claim 1, wherein renewal periods are chosen to minimize network traffic.

11. The method of claim 1, wherein renewal periods are chosen to maximize certificate lifetime.

12. The method of claim 11, wherein the duration of a certificate is 20 years.

13. The method of claim 1, wherein a certificate includes a first cryptographic key, the method further comprising providing a rekey certificate with a second cryptographic key, different from the first cryptographic key.

14. The method of claim 13, wherein the rekey certificate is provided after a predetermined interval after the certificate with the first cryptographic key is provided.

15. The method of claim 14, wherein the predetermined interval is 30 years.

16. An apparatus for providing a certificate in a digital security system, the apparatus comprising:
   at least one computer;
   a first certificate authority (CA), implemented on the at least one computer, which issues a first certificate, wherein the first certificate has a first renewal period; and
   a second CA, implemented on the at least one computer, which issues a second certificate by using at least a portion of information in the first certificate, said second certificate having a validity period, said first renewal period and said validity period overlapping one another, said second CA further issuing a third certificate unique to a given device by using at least a portion of information in the second certificate; said third certificate being stored in said given device;
   wherein a new certificate is issued by the first CA to be used in subsequent issuing operations of the first CA and the second CA in place of the first certificate, and
   wherein the validity period of the second certificate overlaps with a renewal period of the new certificate.

17. The apparatus of claim 16, wherein renewal are chosen to minimize network traffic.

18. The apparatus of claim 16, wherein renewal periods are chosen to maximize certificate lifetime.

19. The method of claim 1, wherein renewal periods are chosen to minimize the number of renewals over a period of time.

* * * * *